(12) United States Patent
Rechsteiner et al.

(10) Patent No.: US 8,225,194 B2
(45) Date of Patent: Jul. 17, 2012

(54) BOOKMARKS AND WATCHPOINTS FOR SELECTION AND PRESENTATION OF MEDIA STREAMS

(75) Inventors: Paul Rechsteiner, Toronto (CA); Shawn R. Neely, Sunnyvale, CA (US); Lawrence Kesteloot, San Francisco, CA (US); Michael A. Malcolm, Aspen, CO (US); Stephen Watson, Toronto (CA)

(73) Assignee: Kaleidescape, Inc., Sunnyvale, CA (US)

( * ) Notice: Subject to any disclaimer, the term of this patent is extended or adjusted under 35 U.S.C. 154(b) by 0 days.

(21) Appl. No.: 10/655,496

(22) Filed: Sep. 3, 2003

(65) Prior Publication Data
US 2004/0139047 A1 Jul. 15, 2004

Related U.S. Application Data

(63) Continuation-in-part of application No. 10/418,739, filed on Apr. 18, 2003, now Pat. No. 7,231,607, and a continuation-in-part of application No. 10/418,949, filed on Apr. 18, 2003, now Pat. No. 7,246,322.

(60) Provisional application No. 60/488,367, filed on Jul. 15, 2003, provisional application No. 60/439,330, filed on Jan. 9, 2003.

(51) Int. Cl.
*G06F 17/00* (2006.01)

(52) U.S. Cl. ........................................ 715/206; 707/805

(58) Field of Classification Search ............... 707/104.1, 707/1, 100, 102, 200, 705, 736, 746, 800, 707/805; 709/231; 715/500.1, 700, 704, 715/716, 735, 744, 853, 854, 855, 200, 205, 715/206
See application file for complete search history.

(56) References Cited

U.S. PATENT DOCUMENTS

| | | | |
|---|---|---|---|
| 4,992,940 A | | 2/1991 | Dworkin |
| 5,237,648 A | * | 8/1993 | Mills et al. ............... 715/723 |
| 5,335,277 A | | 8/1994 | Harvey et al. |
| 5,337,357 A | | 8/1994 | Chou et al. |
| 5,392,244 A | | 2/1995 | Jacobson et al. |
| 5,410,415 A | | 4/1995 | Parulski et al. |
| 5,457,791 A | | 10/1995 | Matsumoto et al. |
| 5,615,352 A | | 3/1997 | Jacobson et al. |
| 5,724,327 A | | 3/1998 | Timmermans et al. |
| 5,765,176 A | | 6/1998 | Bloomberg |

(Continued)

FOREIGN PATENT DOCUMENTS

EP 1039397 9/2000

(Continued)

OTHER PUBLICATIONS

Home Theater Info. "DVD player technology." 1999-2005, Home Theater Info, http://hometheaterinfo.com/dvd6.htm.

(Continued)

*Primary Examiner* — Greta Robinson

(57) ABSTRACT

Selection and presentation of media streams, in which presentation is not limited by order imposed by the digital content representative of those media streams, in response to bookmarks and watchpoints settable and usable by a user. Bookmarks reference a location within the media stream, not necessarily pre-selected and possibly dynamically selected, in which a presentation can be started or restarted therefrom. Watchpoints reference a location within the media stream, or a presentation state for the media stream, in which an action can be triggered thereby. Bookmarks and watchpoints provide a general technique for presenting selections from media streams in response to metadata.

44 Claims, 2 Drawing Sheets

U.S. PATENT DOCUMENTS

| | | | |
|---|---|---|---|
| 5,805,799 A | 9/1998 | Fredrickson et al. | |
| 5,859,662 A | 1/1999 | Cragun et al. | |
| 5,896,454 A | 4/1999 | Cookson et al. | |
| 5,915,067 A | 6/1999 | Nonomura et al. | |
| 5,946,665 A | 8/1999 | Suzuki et al. | |
| 5,991,804 A | 11/1999 | Bolosky et al. | |
| 6,009,525 A | 12/1999 | Horstmann | |
| 6,035,373 A | 3/2000 | Iwata | |
| 6,052,759 A | 4/2000 | Stallmo et al. | |
| 6,182,069 B1 | 1/2001 | Niblack et al. | |
| 6,192,139 B1 | 2/2001 | Tao | |
| 6,209,092 B1 | 3/2001 | Linnartz | |
| 6,229,524 B1 | 5/2001 | Chernock et al. | |
| 6,260,024 B1 | 7/2001 | Shkedy | |
| 6,278,446 B1 | 8/2001 | Liou et al. | |
| 6,304,942 B1 | 10/2001 | DeKoning | |
| 6,349,143 B1* | 2/2002 | Hastings et al. | 382/128 |
| 6,360,057 B1 | 3/2002 | Tsumagari et al. | |
| 6,366,910 B1 | 4/2002 | Rajaraman et al. | |
| 6,393,158 B1 | 5/2002 | Gould et al. | |
| 6,411,725 B1 | 6/2002 | Rhoads | |
| 6,463,426 B1 | 10/2002 | Lipson et al. | |
| 6,463,431 B1 | 10/2002 | Schmitt | |
| 6,480,669 B1 | 11/2002 | Tsumagari et al. | |
| 6,484,156 B1 | 11/2002 | Gupta et al. | |
| 6,556,773 B2 | 4/2003 | Tsumagari et al. | |
| 6,556,774 B2 | 4/2003 | Tsumagari et al. | |
| 6,557,119 B1* | 4/2003 | Edwards et al. | 714/38 |
| 6,564,008 B2 | 5/2003 | Tsumagari et al. | |
| 6,574,421 B2 | 6/2003 | Tsumagari et al. | |
| 6,584,277 B2 | 6/2003 | Tsumagari et al. | |
| 6,625,581 B1 | 9/2003 | Perkowski | |
| 6,628,892 B2 | 9/2003 | Tsumagari et al. | |
| 6,629,097 B1 | 9/2003 | Keith | |
| 6,642,939 B1 | 11/2003 | Vallone et al. | |
| 6,701,391 B1 | 3/2004 | Ayat et al. | |
| 6,798,976 B2 | 9/2004 | Tsumagari et al. | |
| 6,799,224 B1 | 9/2004 | Dellacona | |
| 6,851,082 B1 | 2/2005 | Corbett | |
| 6,889,302 B2 | 5/2005 | Gibble et al. | |
| 6,889,383 B1* | 5/2005 | Jarman | 725/28 |
| 6,957,232 B2 | 10/2005 | Hoeye et al. | |
| 6,971,013 B2 | 11/2005 | Mihcak et al. | |
| 7,003,131 B2 | 2/2006 | Watson et al. | |
| 7,032,093 B1 | 4/2006 | Cameron | |
| 7,032,177 B2 | 4/2006 | Novak et al. | |
| 7,036,024 B2 | 4/2006 | Watson | |
| 7,099,491 B2 | 8/2006 | Takaku | |
| 7,111,171 B2 | 9/2006 | Collens et al. | |
| 7,178,106 B2 | 2/2007 | Lamkin et al. | |
| 7,181,044 B2 | 2/2007 | Watson et al. | |
| 7,188,248 B2 | 3/2007 | Watson | |
| 7,231,607 B2* | 6/2007 | Neely et al. | 715/747 |
| 7,246,322 B2* | 7/2007 | Neely et al. | 715/747 |
| 2001/0026618 A1 | 10/2001 | Van Wie et al. | |
| 2001/0037465 A1 | 11/2001 | Hart et al. | |
| 2001/0039659 A1 | 11/2001 | Simmons et al. | |
| 2001/0051996 A1 | 12/2001 | Cooper et al. | |
| 2002/0026618 A1* | 2/2002 | Wang | 714/786 |
| 2002/0059238 A1 | 5/2002 | Saito | |
| 2002/0069218 A1 | 6/2002 | Sull et al. | |
| 2002/0085713 A1 | 7/2002 | Feig et al. | |
| 2002/0087876 A1 | 7/2002 | Larose | |
| 2002/0095582 A1 | 7/2002 | Peled et al. | |
| 2002/0116707 A1 | 8/2002 | Morris et al. | |
| 2002/0118299 A1 | 8/2002 | Kahn | |
| 2002/0138741 A1 | 9/2002 | Koch | |
| 2002/0143813 A1* | 10/2002 | Jellum et al. | 707/511 |
| 2002/0147782 A1 | 10/2002 | Dimitrova et al. | |
| 2002/0150277 A1 | 10/2002 | Nishimoto et al. | |
| 2002/0163532 A1 | 11/2002 | Thomas et al. | |
| 2002/0169789 A1* | 11/2002 | Kutay et al. | 707/104.1 |
| 2002/0172394 A1 | 11/2002 | Venkatesan et al. | |
| 2002/0174021 A1 | 11/2002 | Chu et al. | |
| 2002/0174416 A1* | 11/2002 | Bates et al. | 717/128 |
| 2002/0178077 A1 | 11/2002 | Katz et al. | |
| 2002/0178192 A1 | 11/2002 | Namioka | |
| 2002/0188943 A1 | 12/2002 | Freeman et al. | |
| 2002/0196976 A1 | 12/2002 | Mihcak et al. | |
| 2003/0014751 A1 | 1/2003 | Paek | |
| 2003/0016943 A1 | 1/2003 | Chung et al. | |
| 2003/0016951 A1 | 1/2003 | Jakel et al. | |
| 2003/0030752 A1* | 2/2003 | Begeja et al. | 348/563 |
| 2003/0037010 A1* | 2/2003 | Schmelzer | 705/67 |
| 2003/0078930 A1 | 4/2003 | Surcouf et al. | |
| 2003/0081857 A1 | 5/2003 | Tapson | |
| 2003/0084298 A1 | 5/2003 | Messerges et al. | |
| 2003/0084375 A1* | 5/2003 | Moore et al. | 714/34 |
| 2003/0086691 A1 | 5/2003 | Yu | |
| 2003/0093790 A1 | 5/2003 | Logan et al. | |
| 2003/0107676 A1 | 6/2003 | Jang | |
| 2003/0110503 A1 | 6/2003 | Perkes | |
| 2003/0122966 A1 | 7/2003 | Markman | |
| 2003/0126599 A1* | 7/2003 | Novak et al. | 725/32 |
| 2003/0139971 A1 | 7/2003 | Rescigno et al. | |
| 2003/0163430 A1 | 8/2003 | Takaku | |
| 2003/0163466 A1* | 8/2003 | Rajaraman et al. | 707/6 |
| 2003/0182297 A1 | 9/2003 | Murakami et al. | |
| 2003/0191738 A1* | 10/2003 | Hoeye et al. | 707/1 |
| 2003/0229900 A1 | 12/2003 | Reisman | |
| 2003/0231257 A1 | 12/2003 | Ochiai et al. | |
| 2004/0002938 A1* | 1/2004 | Deguchi | 707/1 |
| 2004/0008864 A1 | 1/2004 | Watson et al. | |
| 2004/0008970 A1 | 1/2004 | Junkersfeld et al. | |
| 2004/0010692 A1 | 1/2004 | Watson | |
| 2004/0010694 A1 | 1/2004 | Collens et al. | |
| 2004/0088557 A1 | 5/2004 | Malcolm et al. | |
| 2004/0114049 A1 | 6/2004 | Arora | |
| 2004/0117605 A1* | 6/2004 | Ahmad et al. | 712/227 |
| 2004/0136698 A1 | 7/2004 | Mock | |
| 2004/0139064 A1 | 7/2004 | Chevallier et al. | |
| 2004/0165483 A1 | 8/2004 | Unger | |
| 2004/0166484 A1* | 8/2004 | Budke et al. | 434/433 |
| 2004/0166915 A1* | 8/2004 | Robarge | 463/9 |
| 2004/0169683 A1 | 9/2004 | Chiu et al. | |
| 2004/0218896 A1 | 11/2004 | Abe et al. | |
| 2004/0218904 A1 | 11/2004 | Yoon et al. | |
| 2004/0223737 A1 | 11/2004 | Johnson | |
| 2004/0252238 A1 | 12/2004 | Park et al. | |
| 2005/0004873 A1* | 1/2005 | Pou et al. | 705/51 |
| 2005/0005191 A1 | 1/2005 | Judd | |
| 2005/0050103 A1 | 3/2005 | Kesteloot et al. | |
| 2005/0086069 A1 | 4/2005 | Watson et al. | |
| 2005/0091452 A1 | 4/2005 | Chen et al. | |
| 2005/0120053 A1 | 6/2005 | Watson | |
| 2005/0125405 A1 | 6/2005 | Watson | |
| 2005/0132405 A1 | 6/2005 | AbiEzzi et al. | |
| 2005/0182989 A1 | 8/2005 | Zarnke et al. | |
| 2005/0188280 A1 | 8/2005 | Ali | |
| 2005/0201726 A1 | 9/2005 | Malcolm et al. | |
| 2007/0106901 A1 | 5/2007 | Collens et al. | |
| 2007/0118812 A1 | 5/2007 | Kesteloot et al. | |
| 2007/0240234 A1 | 10/2007 | Watson | |
| 2007/0283276 A1 | 12/2007 | Neely et al. | |
| 2007/0294297 A1 | 12/2007 | Kesteloot et al. | |

FOREIGN PATENT DOCUMENTS

| | | |
|---|---|---|
| EP | 1174803 | 1/2002 |
| EP | 1 199 647 A2 | 4/2002 |
| FR | 2 750 554 A1 | 1/1998 |
| FR | 2 786 973 A1 | 6/2000 |
| JP | 05 137090 A | 6/1993 |
| JP | 07-281293 | 10/1995 |
| JP | H09-023417 | 1/1997 |
| JP | 2005-533410 A | 11/2005 |
| JP | 2005-533416 A | 11/2005 |
| JP | 2006-518063 A | 8/2006 |
| WO | WO 01/37479 | 5/2001 |
| WO | WO 02/073378 A2 | 9/2002 |
| WO | WO 02/075591 A1 | 9/2002 |
| WO | WO 2004/006168 | 1/2004 |
| WO | WO 2004/006494 | 1/2004 |
| WO | WO 2004/006559 | 1/2004 |
| WO | WO 2004/006579 | 1/2004 |
| WO | WO 2004/062945 A2 | 7/2004 |
| WO | WO 2004/064293 A2 | 7/2004 |
| WO | WO 2004/064372 A2 | 7/2004 |

| | | |
|---|---|---|
| WO | WO 2004/070585 A2 | 8/2004 |
| WO | WO 2004/070998 A2 | 8/2004 |
| WO | WO 2005/009024 | 1/2005 |
| WO | WO 2005/009024 A2 | 1/2005 |
| WO | WO 2005/079375 | 9/2005 |
| WO | WO 2005/086985 | 9/2005 |
| WO | WO 2006/025833 | 3/2006 |
| WO | WO 2006/055938 A2 | 5/2006 |
| WO | WO 2007/149405 A2 | 12/2007 |
| WO | WO 2008/005174 A2 | 1/2008 |

OTHER PUBLICATIONS

Inmatrix.com. "Zoom player on-line documentation." Inmatrix.com, http://www.inmatrix.com/zplayer/featuredetail/shtml.
NVIDIA Corporation. "NVDVD 2.0." 2005, NVIDIA Corporation http://nvidia.com/page/nvdvd.html.
Shuvalov, Andrew. "Stony Brook Video Server Project." 1999, SUNY Stony Brook, http://www.ecsl.cs.sunvsb.edu/~andrew/VideoServer/videoserver/index/c26.html.
"The Brain's Web." 2002 http://membres.lycos.fr/subrip.
Dittman. "Combining Digital Watermarks and Collusion Secure Fingerprints for Customer Copy Monitoring," Secure Images and Image Authentication, 2000, pp. 1-6, The Institution of Electrical Engineers, IEE, London.
Fridrich. "Copyright Protection of Digital Images (Authentication)," Feb. 18, 2003, http://www.ws.binghamton.edu/fridrich/Research'tutor2.ppt.
Rey. "A Survey of Watermarking Algorithms for Image Authentication," EURASIP Journal on Applied Processing, 2002, pp. 613-621, vol. 6, Hindawi Publishing Corporation.
Sato et al, "Implementation of Scenario Control Mechanism in Crew", Computer Software, Japan Society for Software Science and Technology, vol. 16 No. 3, pp. 47-56 (May 17, 1999).
PCT, Application PCT/US2004/000302 and search report, Mar. 15, 2006.
JPO, Notice of Rejection of Application No. 2006-500820 (translation) and corresponding claims, Jan. 5, 2010.
JPO, Notice of Final Rejection of Application No. 2006-500820 (translation) and corresponding claims, Aug. 24, 2010.
JPO, Notice of Final Rejection of Application No. 2006-500820 (translation) and corresponding claims, Apr. 5, 2011.
JPO, current claims of Divisional Application of Application No. 2006-500820, Jul. 28, 2011.
Kaleidescape, Inc., Claims in European Patent Application 04700867.7 as of Mar. 9, 2006.
EPO, European Search Report in European Patent Application 04700867.7 dated Apr. 8, 2008.
Kaleidescape, Inc., Claims in European Patent Application 04700867.7 as of Jul. 4, 2008.
EPO, Communication in European Patent Application 04700867.7 dated Oct. 20, 2009.
Kaleidescape, Inc., Claims in European Patent Application 04700867.7 as of Mar. 18, 2010.
Adobe Systems Incorporated. "Adobe encore DVD: Creative authoring for professional DVD production." 2005, Adobe Systems Incorporated, http://www.adobe.com/products/encore/main.html.
Home Theater Info. "DVD player technology." 1999-2005. Home Theater Info, http://hometheaterinfo.com/dvd6htm.
Inmatrix.com. "Zoom player on-line documentation." Inmatrix.com, http://www.inmatrix.com/zplaer/featuredetail/shtml.
Macromedia, Inc. "Macromedia Flash MX 2004." 1995-2005, Macromedia, Inc., http://macromedia.com/software/flash/.
NVIDIA Corporation. "NVDVD 2.0" 2005, NVIDIA Corporation, http://nvidia.com/page/nvdvd.html.
Shuvalov, Andrew, "Stony Brook Video Server Project," 1999, SUNY Stony Brook, http://www.ecsl.cs.sunysb.edu/~andrew/VideoServer/videoserver/index/c26.html.
"The Brain's Web." 2002, http://membres.lypos.fr/subrio.
Theatertek, Inc. "TheaterTek DVD." 2004, TheaterTek, Inc., http://www.theatertek.com/Products/DVD.
Okamura et al, "Iplus TV: A Data Broadcasting Mechanism Using Time-lined Hypermedia and Its Implementation", IPSJ Transactions, Information Processing Society of Japan, vol. 40 No. SIG5 (TOD2), pp. 91-102 (May 15, 1999).

* cited by examiner

BOOKMARKS AND WATCHPOINTS FOR SELECTION AND PRESENTATION OF MEDIA STREAMS

INCORPORATED DISCLOSURE

This application claims priority of the following documents, each of which is hereby incorporated by reference as if fully set forth herein.

U.S. provisional patent application 60/439,330, filed Jan. 9, 2003, in the name of Shawn NEELY, Lawrence KESTELOOT, Margaret NOVOTNY, Marion BUCHENAU, Sheila FOLEY, and Michael O'NEIL, titled "User Interface for Video Selection and Display".

U.S. patent application Ser. No. 10/418,949, filed Apr. 18, 2003, in the name of Shawn NEELY, Lawrence KESTELOOT, Margaret NOVOTNY, Marion BUCHENAU, Sheila FOLEY, and Michael O'NEIL, now U.S. Pat. No. 7,246,322 titled "Guide-Like User Interface for Video Selection and Display".

U.S. patent application Ser. No. 10/418,739, filed Apr. 18, 2003, in the name of Shawn NEELY, Lawrence KESTELOOT, Margaret NOVOTNY, Marion BUCHENAU, Sheila FOLEY, and Michael O'NEIL, now U.S. Pat. No. 7,231,607 titled "Mosaic-Like User Interface for Video Selection and Display".

U.S. provisional patent application 60/488,367, filed Jul. 15, 2003, in the name of Paul RECHSTEINER, Shawn NEELY, Lawrence KESTELOOT, Daniel COLLENS, Robert ZARNKE, Nik GERVAE, Ray DEPAUL, Richard CZEGLEDI, and Kevin HUI, titled "Bookmarks and Watchpoints for Selection and Presentation of Media Streams".

These documents are hereby incorporated by reference as if fully set forth herein, and are sometimes referred to herein as the "incorporated disclosure".

Inventions described herein can be used in combination or conjunction with technology described in the incorporated disclosure.

BACKGROUND OF THE INVENTION

1. Field of the Invention

The invention relates to selection and presentation of media streams; in aspects thereof, the invention relates to bookmarks and watchpoints, and to event handling, for selection and display of videos from media, such as for example DVD and other related media.

2. Related Art

In systems for presenting information, such as for example information relating to audiovisual media, users are able to present information already recorded on digital media. For example, DVD player systems provide users with the ability to playback digital content pre-recorded on DVD media. In the incorporated disclosure (as described below) such systems provide users with the ability to present (that is, display video elements of and play audio elements of) media streams, either after or concurrently with download of digital content representing those media streams. In the incorporated disclosure (as described below) such systems further provide the capability of downloading that digital content from one or more content servers.

A first problem with known DVD media playback is that the process of playback involves interaction between the user and a pre-selected sequence of playback capabilities, recorded onto the DVD media by someone other than the user (such as a creator or distributor of that DVD media). For example, playback might involve navigation of a selection menu, might involve playback of audiovisual messages the creator or distributor has determined are advantageous for the user to be forced to watch (such as for example an anti-piracy warning, or such as for example one or more advertisements or pre-release announcements). Accordingly, it would at some times be advantageous to avoid being restricted by choices imposed on them by the creator or distributor of the DVD media.

A second problem with known playback techniques is that the user might have a substantial library of media streams from which the user might desire to present. For a first example, the user might wish to present short clips (or "trailers") of individual movies as part of a process of selection or review of those individual movies. For example, the user might wish to present a trailer for an individual movie as part of deciding whether to purchase that movie (including for example on-line purchase of a downloaded copy) or to present that movie to a selected audience (including for example determining if that audience was interested in the movie in response to the selected trailer). For a second example, the user might wish to point to selections from media streams when analyzing, commenting on, reviewing, or selecting portions thereof. A first example thereof might be a biography of a known actor or director, including selections of short clips of scenes used for illustrative, scholarly, literary, artistic, political, or social purposes. A second example thereof might be that the user wishes to present a short clip, such as a favorite scene, for presentation to a selected audience (including for example just the user themselves), or as part of a pedagogical exercise (including for example as a demonstration of acting technique or camera work).

Both these problems are exacerbated by increases in the number of DVD media providers (whether creators or distributors), and by increases in the number of media streams available to the user. Moreover, both these problems might inhibit development of a convenient UI (user interface) for selection and presentation of media streams, whether from recorded physical media or downloaded from one or more content servers.

Accordingly, it would be advantageous to provide an improved technique for video selection and presentation, relatively less subject to problems with known techniques.

SUMMARY OF THE INVENTION

The invention provides a method and system capable of selection and presentation of media streams, in which presentation is not substantially limited by any order imposed by the digital content representative of those media streams.

In one aspect, the invention provides a method and system capable of creating and referencing a bookmark to a location selected within the media stream, not necessarily pre-selected by the creator or distributor of that media stream, and possibly dynamically selected by a recipient of digital content representing that media stream. In addition to referencing the bookmark, the invention provides a user with the capability of starting or restarting presentation from the selected bookmark.

In one aspect, the invention provides a method and system capable of creating a watchpoint at a location selected within the media stream, or a presentation state otherwise associated with presentation of the media stream, capable of associating with that watchpoint one or more watchpoint triggers (indicating on what conditions the watchpoint is triggered) and one or more watchpoint actions (indicating what actions are taken in response to triggering the watchpoint). For one example, the user might designate a bookmark at the beginning of a selected film clip, a watchpoint trigger with the end of that same film clip, and a watchpoint action associated with the watchpoint, which watchpoint action directs a presentation device to return to a presentation state it was at before presenting from the bookmark. In this example, the film clip effectively acts as a media element capable of being inserted into another, different, media stream (or more generally, into any other user interface or media presentation, the original user interface or media presentation not necessarily including any original media streams of its own), without involving any other digital content associated with the larger media stream that contains that film clip.

In one aspect, the invention provides a method and system capable of selecting one of a set of such film clips (bookmark-watchpoint pairs) for presentation, in response to a user input, a user preference, a playback device configuration, demographic information about the user or the playback device, or other pertinent information. For a first example, a one or more DVD's might have a first version of its movie better suited for presentation on a regular television screen, and a second version of its movie better suited for presentation on a wide-screen or HDTV television screen (currently, the movie "Shrek" is sometimes marketed with two separate DVD's, one of which includes a widescreen version and one of which includes a narrowscreen version). For a second example, one or more DVD's might have a first version of its movie better suited for presentation to a mature audience, and a second version of its movie better suited for presentation to a less-mature audience. For a third example, a single DVD might have a set of versions of its movie with selected different plot points or movie endings, for those different audiences or users who prefer the movie to have a happy ending or otherwise. For a fourth example, a single DVD might have a shorter (abridged) and a longer (unabridged) version of the same movie, selectable by the user.

In one aspect, the invention provides a method and system capable of selecting one of a set of such film skips (watchpoint-bookmark pairs), with the effect that a section of a media stream might be skipped, censored, or otherwise edited out, in response to a user input, a user preference, a playback device configuration, demographic information about the user or the playback device, or other pertinent information.

In one aspect, the invention provides a method and system capable of testing one or more state variables at such bookmarks or watchpoints, and of taking different actions in response to distinct values of those state variables. In one embodiment, the invention provides a user with the capability of designing a sequence of actions (conditional or unconditional), by which selections from media streams might be presented in response to digital content representing those media streams and in response to other information. Such other information might include the scope of a license afforded to the user, demographic or other metadata about that user, or interactive activity with that user (or more than one such user). Such a sequence of actions might be recorded, retrieved, transmitted, or received, similar to digital content representing any other type of media stream.

In one embodiment, the invention might include bookmarks created or edited using one or more techniques or by one or more types of creators. For a first example, bookmarks might be created in conjunction with the original content, such as for example by an author, creator, distributor, or synchronizer, of the original content. For a second example, bookmarks might be created by a party other than in conjunction with the original content, such as for example by a secondary distributor of the content, a server providing the content to an end-user along with newly-associated metadata, a translator of the original content, such as a person adding subtitles in a second or an alternative language or "dubbing" in sound in a second or an alternative, or such as an editor of the movie for a specific purpose, such as for example a purpose suitable for airliner use, for children, or for export to selected countries. For a third example, bookmarks might be created by end-user preferences, either explicit or implicit or some combination or conjunction thereof, such as for example in response to the end-user designating a favorite scene, or such as for example in response to the end-user skipping over a disfavored scene, or such as for example in response to preferences implied by demographic information about the end-user. Similar to bookmarks, the invention might also include watchpoints created using one or more techniques or by one or more types of creators, as described above with regard to creation or editing of bookmarks.

After reading this application, those skilled in the art would recognize that the invention is an enabling technology by which substantial advance is made in the art of media streams and digital content representative thereof. For example, the invention might be used to provide one or more of, or some combination or extension or mixture of, any of the following:

Saving selected scenes from movies and requesting playback of those scenes, either in response to user command, pointers to those scenes, or metadata describing those scenes.

Pausing movies during presentation on a first device and requesting playback on a second device, such as for example in response to user command.

Assembling a collection of such selected scenes, possibly along with commentary, or possibly embedded in another media stream for which those selected scenes are exemplary or illustrative.

Assembling a collection of bookmarks or watchpoints, possibly along with commentary; maintaining that collection in a database or other metadata; or sending that collection from one device to another.

Creating and presenting a demonstration of a home video system, including demonstration of selection and presentation of media streams as part of the demonstration. In one embodiment, the demonstration itself might be interactive, and include the capability for the user to select which media streams are selected or presented as part of the demonstration itself.

Creating and presenting a media stream by which a pseudorandom or random process determines presentation of such selected scenes, possibly in response to other information. In one embodiment, the pseudorandom or random process might select film clips in response to known preferences of the user, thus providing the capability of a film clip "screen saver" or a variant of the MTV channel.

Pausing, restarting, and repeating presentation of media streams, even for media for which such functions are not originally supported.

Direct access to feature presentations within recorded digital media, without any substantial requirement for navigating via pre-recorded menus or pre-recorded advertising, announcements, or warnings.

Direct access to supplements to such feature presentations, or trailers associated with such feature presentations, within recorded digital media, without any substantial requirement for navigating via pre-recorded menus or pre-recorded advertising, announcements, or warnings.

Presentation of media streams represented by digital content recorded on multiple volumes of digital media, such as for example movies recorded on more than one DVD, without any substantial requirement for the user to intervene at a switching point between those multiple volumes.

Performing operations external to presentation in response to the media stream, such as for example turning up room lights at the start of movie credits, diminishing sound volume during commercial breaks, or pausing presentation in response to aspects of the movie (such as for example at a commercial break in a broadcast movie).

Creating and presenting a computer game using individual film clips, either from pre-existing DVD media or newly-created digital content. For example, the computer game might be interactive, or might respond to external information, such as for example a television news feed.

In one embodiment, the invention includes a representation of a presentation state and a virtual machine state, each of which is updated concurrently with presentation of the media stream.

A bookmark preferably includes a defined presentation state and virtual machine state to which a presenting device might be set, with the effect of providing that presenting device with the capability of presentation beginning at that bookmark. In one embodiment, presentation might instead begin at a closest "entry location" designated by the digital content representing that media stream. In one embodiment, the defined presentation state or virtual machine state might include a known "title number" within DVD media on which is recorded the digital content representing that media stream.

A watchpoint preferably includes a defined presentation state and virtual machine state, along with one or more associated triggerable actions, with the effect that whenever the presenting device attempts to match its presentation state and virtual machine state with that watchpoint, a first sufficient degree of similarity with the triggering condition (possibly for a first subset of data associated with each such state) would cause the watchpoint to be triggered, and a second sufficient degree of similarity with a conditional choice of action (possibly for a second subset of data associated with each such state) would cause the associated actions would be performed. For example, the presenting device might attempt to match its presentation state and virtual machine state with selected watchpoints after each known frame of the media stream, or at the beginning or end of each subsegment of the media stream designated by the digital content representing that media stream.

BRIEF DESCRIPTION OF THE DRAWINGS

FIGS. 2A to 2D, shows a process flow diagram of a method including operation of a system including bookmarks and watchpoints for video selection and presentation.

DETAILED DESCRIPTION OF THE PREFERRED EMBODIMENT

Figure 1:
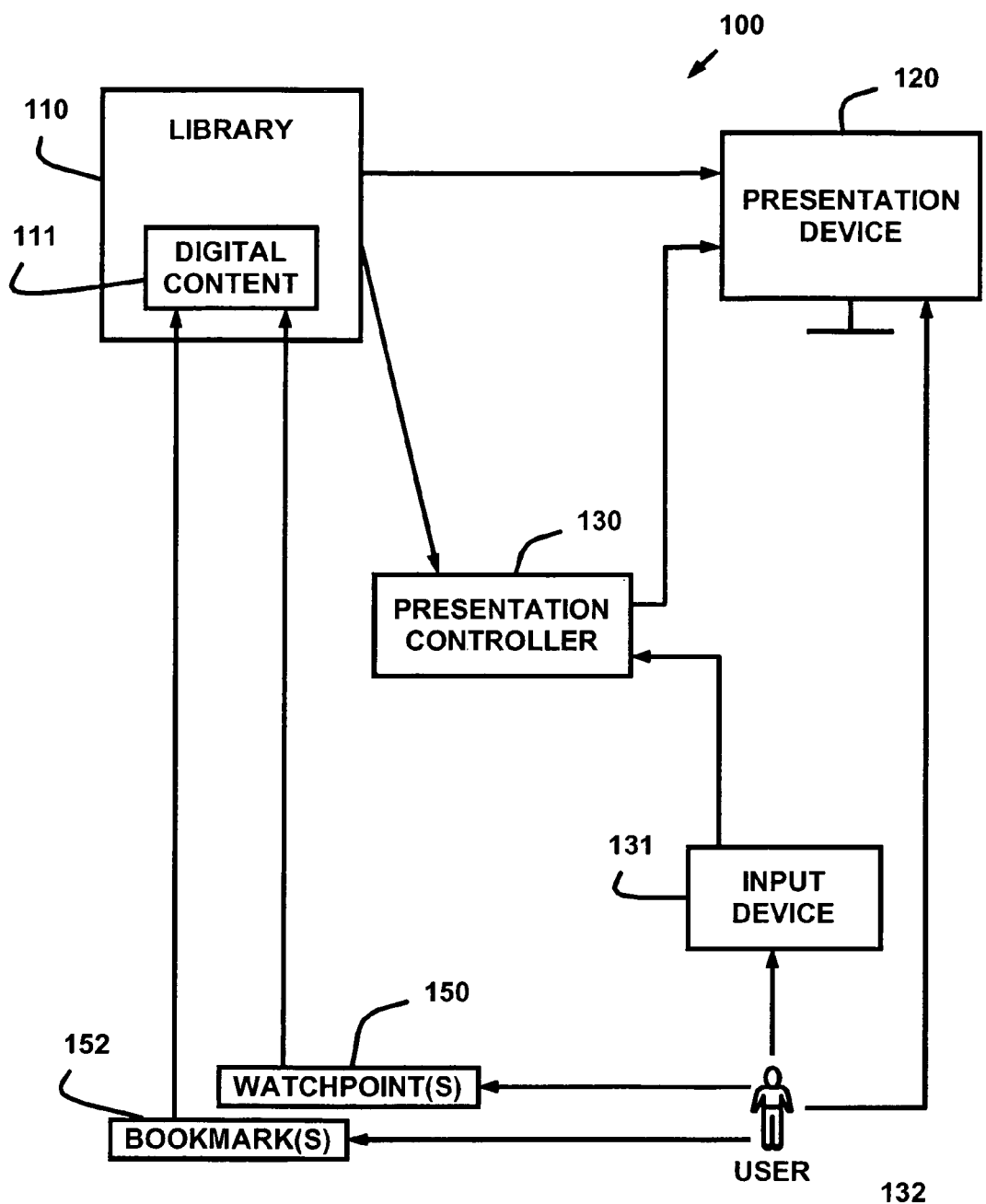
FIG. 1 shows a block diagram of a system including bookmarks and watchpoints for video selection and presentation.

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

The phrase "DVD media content format," and the like, describes a family of encoding formats including DVD-audio and DVD-video (such as for example used with media including digital video disks or equivalents thereof). DVD media content format is a specific example of one of many possible formats in which digital content might be encoded.

The phrase "digital media," and the like, describes physical media capable of maintaining digital content in an accessible form. Digital media includes disk drives (including magnetic, optical, or magneto-optical disk drives), as well as any other physical media capable of maintaining information, such as digital content.

The terms "playback," "presentation," and the like, describe presentation (such as for example to one or more users) of audio, visual, or other features of media streams.

The phrase "content server" describes a device (or a portion thereof, or a set of such devices or portions thereof capable of sending digital content to recipients. For example, a content server might include a web server at which a user is provided the capability of purchasing digital media for download. In the context of this application, there is no particular requirement that the server be (logically or physically) located at any particular address or place, or have any particular architecture, or use any particular protocol for communication. For example, the content server might include a process logically available to a local presentation device.

The term "bookmark" describes a reference to a logical location selected within a media stream. In one embodiment, bookmarks are not necessarily pre-selected by the creator or distributor of that media stream, and are possibly dynamically selected by a recipient of digital content representing that media stream. In one embodiment, presentation devices are capable of starting or restarting presentation from a selected bookmark.

The term "watchpoint" describes an association of at least one watchpoint trigger and at least one watchpoint action. This has the effect that a watchpoint is capable of being treated as an "IF-THEN" construct, where the watchpoint trigger is the "IF" part of the construct and the watchpoint action is the "THEN" part of the construct. Those one or more watchpoint actions might be conditioned on some other data or state information. For one example, the user might designate a bookmark at the beginning of a selected film clip, and a watchpoint including (1) a watchpoint trigger associated with the end of that same film clip, and (2) a watchpoint action directing a presentation device to return to a presentation state it was at before presenting from the bookmark. In this example, the film clip effectively acts as a media element capable of being inserted into another, different, media stream, without involving any other digital content associated with the larger media stream that contains that film clip.

The phrase "watchpoint action" describes an action to be performed in response to triggering a watchpoint (when the conditions of the watchpoint trigger occur). Watchpoint actions might be conditioned on some other data or state information.

The phrase "watchpoint trigger" describes a reference to a logical state of a presentation device, such as for example a logical location selected within a media stream. When that logical state (or any other condition used as a watchpoint trigger) occurs, the watchpoint is triggered and the watchpoint action part of the watchpoint is performed.

The scope and spirit of the invention is not limited to any of these definitions, or to specific examples mentioned therein, but is intended to include the most general concepts embodied by these and other terms.

System Elements

FIG. 1 shows a block diagram of a system including bookmarks and watchpoints for video selection and presentation.

A system 100, such as for example an end-user system, includes a library 110 or other storage including digital content 111 representing a media stream, such as for example in a DVD media content format, a presentation device 120, and a presentation controller 130.

In one embodiment, the library 110 might include one or more of: a DVD reader; a disk drive (whether magnetic, optical, magneto-optical, or otherwise); a "jukebox" or other collection of multiple readers for physical media such as DVD's or disk drives; a communication link to a web server, file server, database server, or other server; a broadcast receiver such as a cable modem or satellite link, or any other device or technique having the capability of delivering digital content to the presentation device 120.

In one embodiment, the presentation controller 130 might include a portion, or be included in a portion, of a PVL (personal video library) associated with the system 100. The library 110 might also include a portion, or be included in a portion, of a PVL (personal video library) associated with the system 100. However, after reading this application, those skilled in the art would recognize that in the context of the invention, no such limitation is required. One such embodiment is further described in the incorporated disclosure.

The presentation controller 130 is, in one embodiment, coupled to at least one input device 131, suitable for receiving commands or other information from a user 132 associated with the presentation device 120, and at least one output device, which in one embodiment includes a portion of, or is included in a portion of, the presentation device 120 itself.

The presentation controller 130 includes a processor, program and data memory, and is capable of receiving those commands or other information, and responding thereto as described herein, with the effect that the user 132 is capable of interacting with the presentation controller 130 as described herein.

There is no particular requirement, in the context of the invention, either (a) that the presentation controller 130 involves an input device 131, or (b) that the presentation controller 130 receives commands or other information from a user 132. In alternative embodiments, the presentation controller 130 may act in response to a preselected set of programming instructions, or in response to a set of sensors not generally considered an input device 131, such as for example a timed program show or a program show responsive to the presence of people to watch it. In alternative embodiments, the presentation controller 130 may act in response to commands or other information from an operator other than a user 132, such as for example a stage director or performer, or a remote teacher engaged in televised instruction.

For just one example of such alternative embodiments, the system 100 may be devised to make presentations of shows at a demonstration device, a sales kiosk, or a trade show. In such alternative embodiments, the presentation controller 130 might be responsive to a timer to present a continuous loop of the same media stream (or a pseudorandomly or randomly selected sequence of different media streams), or might be responsive to the absence or presence of heat (using an IR sensor), light, or sound to determine the absence or presence of a viewing audience of sufficient size, and in response thereto, might be responsive to the audience and its size to present an automatically selected sequence of media streams.

As described above, the library 110 includes (or includes access to) digital content 111 representing a media stream, such as for example in a DVD media content format. Typically, the user 132 interacts with a user interface at a selected presentation device 120, with the effect that the user 132 might choose for presentation an episode or show that forms at least a portion of the digital content 111. The presentation device 120 interacts with the library 110 to obtain the portion of the digital content 111 representing the media stream for that episode or show. The library 110 sends that portion of the digital content 111 to the presentation device 120, with the effect that the presentation device 120 presents the media stream represented by that portion of the digital content 111 to the user 132.

After reading this application, those skilled in the art would recognize that specifications for aspects of DVD devices and methods, including DVD-audio, DVDvideo, and related specifications, actually support a more interactive method of behavior. However, but that any such interactive behavior involves pre-programming that interactive behavior into the digital content 111 before the library 110 (or other storage or communication) receives that digital content 111. There is no substantial provision for the user 132 to create a new interactive behavior, or to use a new interactive behavior created after that digital content 111 was originally created.

The digital content 111 in a DVD media content format includes a sequence of instructions, each either (a) directing a virtual machine state change, or (b) directing presentation of at least a portion of a media stream. In one embodiment, the virtual machine state includes a plurality of registers, at least some of which are read-only and describe the presentation device 120 configuration, while at least some (others) are more general in purpose, such as for example a register storing whether a certain portion of the DVD had already been viewed. In such an embodiment, the virtual machine instructions either (a) alter, update, or otherwise modify virtual machine registers, or (b) direct presentation of at least a next portion of a media stream.

The presentation device 120 also includes a presentation state, distinct from the virtual machine state, which describes at least some internal state of the presentation device 120 as it parses and presents the portion of the media stream represented by the digital content 111. As the digital content 111 is read, parsed, and converted to a format with which the presentation device 120 might present the portion of the media stream, the presentation state of the presentation device 120 changes, without necessarily changing the virtual machine state of the presentation device 120.

The phrase "media stream state" generally describes a complete state, including both the virtual machine state and the presentation state, of the presentation device 120.

After reading this application, those skilled in the art would recognize that the virtual machine state can be responsive to the presentation state (although in one embodiment the virtual machine state is unchanged by changes in the presentation state), and that the presentation state can be responsive to the virtual machine state (although in one embodiment the presentation state is responsive to the digital content 111).

Bookmarks 150 describe a reference to a logical location selected within a media stream. In one embodiment, bookmarks can be pre-selected by the creator or distributor of that media stream. In one embodiment, bookmarks are dynamically selected by user 132 of digital content 111 representing a media stream. In one embodiment, presentation devices are capable of starting or restarting a presentation from a selected bookmark.

Watchpoints 152, including their watchpoint triggers and watchpoint actions, might be conditioned on other state information or input, with the effect that both the virtual machine state and the presentation state might be made responsive to any conditions or data those watchpoint triggers or watchpoint actions are able to test. For one example, not intended to be limiting in any way, conditional watchpoint triggers or watchpoint actions might be responsive to information of the following types:

hardware or software information relating to the construction, make, model, origin, point of sale, amount of memory, processor speed, or other information regarding how the presentation device 120 is constructed;

demographic information relating to the nature of the user 132, including the user's age, home location, income, VALS evaluation, preferences, or other information regarding uses made by the user 132 of the presentation device 120, including for example a current GPS location of the presentation device 120 or of the user 132;

dynamic information relating to external events, including for example the presence or absence of other persons near the presentation device 120 (and if those persons are known as other users 132, demographic information relating to their nature, or alternatively, a number of such persons), and including for example the operation of other equipment in the same room, suite, apartment, or building in which the presentation device 120 is located (such as for example, whether a door is opened or closed, whether a telephone rings, whether lights are turned on, a temperature inside or outside, a time of day, a day of the week, a week of the year, whether or not the selected day is or precedes a school holiday, and the like).

or dynamic information relating to external data, including for example data regarding news announcements, public events, stock tickers, weather, and the like (any or all of which might be filtered or searched in response to keywords, with the effect that the user 132 is capable of causing the presentation device 120 to respond to new announcements involving selected celebrities or types of event, sports events or weather involving a selected city or region, stock tickers regarding selected companies or industries, and the like);

Method of Operation

Figure 2:
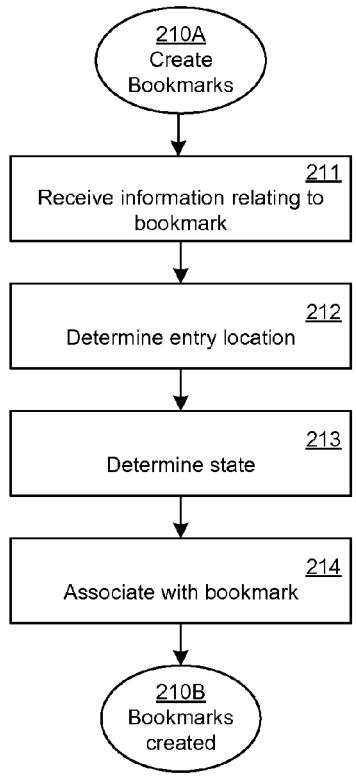
FIG. 2, including
Figure 2:
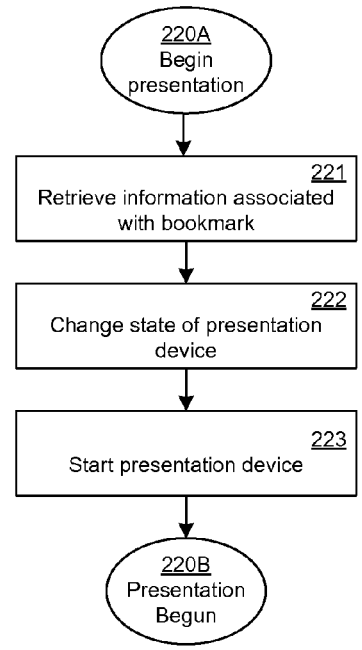
Figure 2:
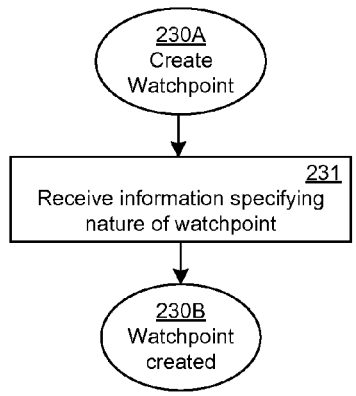
Figure 2:
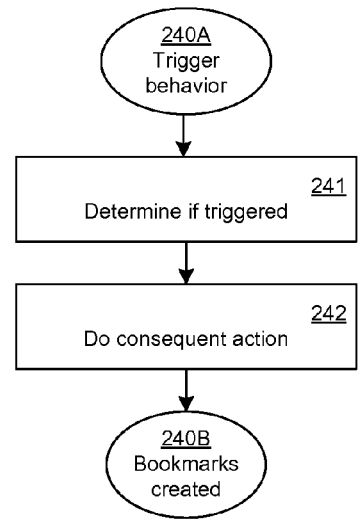

FIG. 2A shows a process flow diagram of a method including operation of a system including bookmarks and watchpoints for video selection and presentation.

A method 200 includes a set of flow points and steps. Although described serially, these flow points and steps of the method 200 can be performed by separate elements in conjunction or in parallel, whether asynchronously or synchronously, in a pipelined manner, or otherwise. There is no particular requirement that the flow points or steps must be performed in the same order as described, except where explicitly so indicated.

Creating Bookmarks

At a flow point 210A, the method 200 is ready to create a bookmark.

At a step 211, the method 200 receives information (such as from an end-user or an operator) specifying the location of the bookmark, and any related information. In one embodiment, that related information might include (a) information relating to the configuration of the presentation device(s) at which presentation from the bookmark is to be specified, (b) information relating to licensing information relating to the media stream of which the bookmark is a part, or (c) other metadata relating to the bookmark, such as for example a title for the bookmark, one or more representative graphics, such as for example thumbnail pictures, associated with the bookmark, a set of configuration information regarding how that thumbnail picture would be presented (or presented in a selected context), or a set of key words associated with the bookmark, with the effect that an end-user or operator might search for one or more of those key words, or edit those key words with the effect of remarking upon the bookmark (for one example, not intended to be limiting in any way, if the bookmark is associated with a time in the media stream at which a great white shark attacks a person, the words "SHARK ATTACK" might be associated with the bookmark, with the effect that an end-user or operator might search for one or more of those words with the effect of finding the shark attack scene).

In one embodiment, at least some of the following information is included in the information the method 200 receives in this step:

A type of entry location (further described below with regard to the next step), such as for example "first play," "top menu," "title menu," "title menu," "end of title," and the like.

A title number, such as for example an integer from 1 to 99. In one embodiment, this value is used only for entry locations of type "title menu" or "end of title."

A start time in frames, seconds, or other measurement from the beginning of the title. In one embodiment, this value is used only for entry locations of type "title menu."

A VTS number, such as for example an integer from 1 to 99. In one embodiment, this value is used only for entry locations of type "title menu."

A VTS title number, such as for example an integer from 1 to 99. In one embodiment, this value is used only for entry locations of type "title menu."

At a step 212, the method 200 determines an "entry location" into a media stream at which presentation devices are capable of beginning presentation without substantial chance that state information for the presentation device would be inaccurate or incomplete. After reading this application, those skilled in the art of presentation of media streams, including for example media streams recorded on DVD media, would recognize that loading a complete image of the state of an arbitrary presentation device might be unwieldy, and further might have the effect of providing inaccurate or incomplete information to that presentation device if the exact presentation device and its configuration were not known ahead of time. Accordingly, in one embodiment, to perform this step, the method 200 searches for an entry location at or near (such as close before or close after) the specified location of the bookmark.

In one embodiment, the method 200 recognizes at least some of the following types of entry location:

- A "first play" type of entry location, such as for example what the presentation device will start with when first noting the presence of the digital content. A "first play" type of entry location is known for DVD players capable of presenting digital content maintained on DVD.
- A "top menu" type of entry location, such as for example a root menu in a tree of menus accessible by the presentation device and maintained on the digital content representing the media stream.
- A "title menu" type of entry location, such as for example an entry location indicating a start of a selected title maintained on the digital content representing the media stream.
- A "title" type of entry location, such as for example an entry location indicating a time T after the start of the selected title maintained on the digital content representing the media stream.
- An "end of title" type of entry location, such as for example an entry location indicating the end of a selected title maintained on the digital content representing the media stream.

For one example, not intended to be limiting in any way, the entry location might be one such as defined by the DVD specification, also described in J. TAYLOR, DVD DEMYSTIFIED (2nd ed., 2001) (McGraw-Hill: N.Y.) (ISBN 0-07-135026-8). Further information is also available in a DVD accompanying that book, and sold therewith. For DVD, an entry location is a defined location in the DVD digital content representing a media stream where the presentation device can begin execution (including parsing of the digital content representing the media stream, and presentation of that media stream). For each type of DVD entry location, there is substantially dictated how each of the virtual machine registers are initialized, while configuration registers for the presentation device are substantially untouched. This has the effect that each entry location is associated with a specific state of the presentation device, which might be further parameterized by configuration settings for that presentation device. After reading this application, those skilled in the art of presentation of media streams, including for example media streams recorded on DVD media, would recognize that the set of all possible states for presentation devices that might be specified by entry locations is a relatively small subset of the set of all possible states for presentation devices (specified by entry locations or not).

At a step 213, the method 200 determines a substantially complete description of a desired state of the presentation device, in response to the information received in the step 211 and the entry location determined in the step 212. In one embodiment, this substantially complete description might include either (a) a substantially complete description of the actual desired state of the presentation device, including configuration information substantially matching the actual presentation device, or (b) a substantially complete description of the entry location, including any further changes in state involved in bringing the presentation device from that entry location to its desired state, and any configuration information involved in bringing the presentation device to its desired state.

At a step 214, the method 200 associates the information it determined with the selected bookmark. In one embodiment, the method 200 records that information in association with the selected bookmark, such as for example in a database of such bookmarks, and maintains that information for later access by an end-user, operator, or the presentation device.

At a flow point 210B, the method 200 has created a bookmark, and is ready to either do so again, or to do something else.

Beginning Presentation from a Bookmark

In FIG. 2B, at a flow point 220A, the method 200 is ready to begin presentation from a designated bookmark.

At a step 221, the method 200 retrieves information associated with the designated bookmark. In one embodiment, that information is the information described with regard to the steps in the section beginning at the flow point 210A, "Creating Bookmarks."

At a step 222, the method 200 changes the state of the presentation device in accordance with the information associated with the designated bookmark. As part of this step, for example, not intended to be limiting in any way, if the designated bookmark indicates a selected entry location in the digital content representing the media stream, the method 200 changes the state of the presentation device to substantially equal information associated with that selected entry location. As part of this step, for example, not intended to be limiting in any way, if the designated bookmark indicates any specified configuration information for the presentation device, the method 200 changes the state of the presentation device to substantially equal that configuration information associated with the designated bookmark.

This step has the effect that the presentation device is changed to a state from which it can begin presentation from the designated bookmark, substantially as if the presentation device has reached that designated bookmark in the ordinary course of parsing the digital content associated with the media stream and presenting that media stream.

At a step 223, the method 200 causes the presentation device to be started with the state set in the previous step, with the effect described in the previous state, that the presentation device can begin presentation from the designated bookmark.

At a flow point 220B, the method 200 has begun presentation from a designated bookmark, and is ready to either do so again, or to do something else.

Creating Watchpoints

In FIG. 2C, at a flow point 230A, the method is ready to create a watchpoint.

At a step 231, similar to the step 211, the method 200 receives information (such as from an end-user or an operator) specifying the nature of the watchpoint, including a set of (a) triggering information, including a designated state information for the presentation device with which method can compare with the actual state information of the presentation device, and (b) consequent actions, including a designated set of actions for the method 200 to take in response to when the watchpoint is triggered.

In one embodiment, the information specifying the triggering information for the watchpoint includes a set of register values specifying a class of states in which the presentation device might be found. This class of states includes both "presentation state," indicating a state of the presentation of the media stream to an end-user, and "virtual machine state," indicating a state of the virtual machine model of parsing the digital content representing the media stream. These states are herein called a "class of states," as there might be more than one state for the presentation device for which the method 200 will consider that the state of the presentation device matches the triggering information for the watchpoint.

After reading this application, those skilled in the art would recognize that bookmarks are capable of being treated as very general labels or references to presentation locations or presentation state. Bookmarks might be the target of a transfer of control or change in presentation state, might be stored independently of the media stream they reference, and might be subject to variable interpretation in response to known parameters. For example, a bookmark might point to "the opening scene of Shrek," or a bookmark might point to "the opening scene of the current movie," where "the current movie" is a parameter that might vary in response to what movie is actually being presented at the time.

After reading this application, those skilled in the art would recognize that watchpoints are capable of being treated as having very general conditional watchpoint triggers and very general conditional watchpoint actions. As noted above, watchpoints have substantial if—then functionality, possibly having conditional watchpoint triggers, conditional watchpoint actions, or both. For a first example, not intended to be limiting in any way, a watchpoint might include a watchpoint trigger and a watchpoint action of the class (user input=X)→(go to bookmark Y). For a second example, not intended to be limiting in any way, a watchpoint might include watchpoint trigger and a watchpoint action of the class (presentation state within class X)→(do arbitrary action Y). For a third example, not intended to be limiting in any way, a watchpoint might include watchpoint trigger and a watchpoint action of the class (presentation state within class is X1) & (user input=X2)→(go to bookmark Y1, and also do arbitrary action Y2).

After reading this application, those skilled in the art would also recognize that bookmarks and watchpoints are very generally capable of being created, edited, or removed dynamically. All such concepts are within the scope and spirit of the invention, and would be workable using the present disclosure without undue experimentation or further invention.

After reading this application, those skilled in the art would recognize that another distinction can be made between blocking techniques (for example, waiting at each change of presentation state or user inputs to review the new class of presentation state or user inputs, with the effect of determining if a watchpoint has been triggered) and polling techniques (for example, periodically, or in response to an interrupt, reviewing the presentation state or user inputs to review the new class of presentation state or user inputs, with the effect of determining if a watchpoint has been triggered). All such concepts are within the scope and spirit of the invention, and would be workable using the present disclosure without undue experimentation or further invention.

In one embodiment, at least some of the triggering information includes either a class of virtual machine states (such as for example, a set of values that must be satisfied by the virtual machine) or a class of presentation states (such as for example, a set of values that must be satisfied by the virtual machine). For one example, not intended to be limiting in any way, the triggering information might specify one or more of the following possible triggers:

Presentation information, such as (a) transliterations or transcriptions of sound forming a part of the presentation or media stream, (b) video elements formatting a part of the presentation or media stream, or (c) metadata included in data streams associated with the presentation or media stream. For example, not intended to be limiting in any way, a scene including people shouting the word "shark!" or a scene including a picture of a shark, or a set of narrative metadata indicating the species of sharks shown in the presentation or media stream, could trigger a watchpoint, either each alone or in some combination or conjunction.

Text information, such as (a) a title number of the portion of the media stream being presented (including the possibility of starting or ending a selected title or title number), (b) text information appearing in closed caption metadata or subtitle metadata. For one example, not intended to be limiting in any way, text information might include a subtitle using the word "shark," with the effect that sources of text information could trigger a watchpoint, either each alone or in some combination or conjunction.

Timing information, such as (a) when a selected amount of time has elapsed from the beginning of presentation, or from the most recent bookmark, or (b) when a selected number of frames have elapsed from the beginning of presentation, or from the most recent bookmark, or (c) some combination or conjunction thereof.

User-entry information, such as (a) when an end-user selects a designated button or key on a console, or (b) if the end-user is detected to be absent or present near the presentation device, or (c) some combination or conjunction thereof.

At a flow point 230B, the method has created a watchpoint, and is ready to either do so again, or to do something else.

Triggering Behavior at a Watchpoint

In FIG. 2D, at a flow point 240A, the method 200 is ready to trigger selected behavior at a designated watchpoint.

At a step 241, performed during presentation of the media stream, the method 200 determines if any of the triggering information, either alone or in combination, triggers the watchpoint. In one embodiment, the watchpoint might include Boolean or other logical aggregates of triggering information. For a first example, not intended to be limiting in any way, a watchpoint might be triggered by having the word "shark!" appear in both the text information and in the presentation information (such as shouted by an actor). For a second example, not intended to be limiting in any way, a watchpoint might be triggered by having at least two actors from a selected set (such as for example the set {Marylin Monroe, Kim Novak, Geena Davis}) appear on screen concurrently.

At a step 242, the method 200 marks the watchpoint as being triggered, and retrieves information relating to consequent actions, including (as described above) a designated set of actions for the method 200 to take in response to when the watchpoint is triggered.

In one embodiment, at least some of the consequent actions might include altering some of the virtual machine states or the presentation states (such as for example altering the order or locus of presentation), or might include actions relating to the home theatre system itself (such as for example altering the house lights, changing the volume, or shutting the system down).

In one embodiment, the consequent actions of the watchpoint might themselves be conditional on a class of presentation states or virtual machine states of the presentation device 120, with the effect that the watchpoint both (a) conditionally triggers, and (b) conditionally selects consequent actions, in response to (possibly different) aspects of the presentation states or virtual machine states of the presentation device 120.

For some examples, not intended to be limiting in any way, the consequent actions of the watchpoint might be conditional on one or more of the following sets of information:

- The watchpoint actions might be conditional on state information about the presentation of the media stream, such as for example how far into the media stream the presentation has gotten so far, or (for a possibly looping media stream) for how long the presentation has gone on so far, or on which type of presentation device 120 or presentation devices 120 the media stream is being presented on, or how many thereof.
- The watchpoint actions might be conditional on information input from the user, such as for example a most recent input from the user, an expressed or implicit preference described by the user, a nature of a recent keyword search, metadata search, or video search requested by the user. In some embodiments, the consequent actions of the watchpoint might include blocking for user input, and be conditional on the absence or presence thereof, and if present, on the nature of that user input, such as for example a choice made by the user, either explicitly, implicitly, or by default.
- The watchpoint triggers might include a code for a class of triggeres, or the watchpoint actions might include a code for a class of actions, where either such class is responsive to a parameter. For a first example, a watchpoint action might be of the class (go to bookmark B[n]), where [n] is a value responsive to a user input, or a value computed in response to a set of virtual registers. For a second example, a watchpoint trigger might be of the class (now presenting the beginning of this movie), where the value of "this movie" is responsive to the specific media stream being presented at that time. Some exemplary watchpoint trigger classes might include: "now presenting the credits for this movie," or "now presenting the end of this movie."

In one embodiment, the consequent actions of the watchpoint, in combination or conjunction with features of bookmarks, can be combined to enable the following features, among others. After reading this application, those skilled in the art would recognize that further concepts and extensions consistent with these features would be workable, that such further concepts and extensions are within the scope and spirit of the invention, and that such further concepts and extensions would not require undue experimentation or further invention.

1. A bookmark can be combined with a watchpoint, with the consequent action of the watchpoint set to return to the locus of presentation before the bookmark was invoked, with the effect that the bookmark-watchpoint section of the media stream can be selected out as an independent element (herein sometimes referred to as a "film clip") for presentation by the presentation device. This feature could be used even if the bookmark and the watchpoint were not located within the same media stream, or even within the same digital content representing a media stream.

For a first set of examples, not intended to be limiting in any way: (a) After a media stream has already been created and distributed to the public, that first media stream is capable of having a user, or other editor or secondary author, include a pointer to a film clip in a second media stream, with the effect that the media stream can include presentation of the film clip as a subroutine within its own presentation, without involving including a copy of that film clip in the first media stream. (b) After a media stream has already been created and distributed to the public, that first media stream is capable of having a user, or other editor or secondary author, include a set of pointers to more than one such film clip, with the effect that the first media stream provides an encyclopedia of such film clips, again without involving including copies of those film clips in the first media stream. (c) After a media stream has already been created and distributed to the public, that first media stream is capable of having a user, or other editor or secondary author, include a set of commentary on a set of film clips, each element of commentary being associated with that actual film clip, against without involving including copies of those film clips in the first media stream.

For a second set of examples, not intended to be limiting in any way: (a) An end-user interface might provide for saving selected scenes from movies and requesting playback of those scenes, either in response to user command, pointers to those scenes, or metadata describing those scenes. (b) An end-user interface might provide for pausing, restarting, or repeating presentation of all or part of a set of media streams, even for digital content or physical media for which such functions were not originally supported. (c) An end-user interface might provide for direct access to feature presentations within recorded digital media, without any substantial requirement for navigating via pre-recorded menus or pre-recorded advertising, announcements, or warnings. (d) An end-user interface might provide for direct access to supplements to such feature presentations, or trailers associated with such feature presentations, within recorded digital media, without any substantial requirement for navigating via pre-recorded menus or pre-recorded advertising, announcements, or warnings. (e) An end-user interface might provide for substantially seamless or smooth presentation of media streams represented by digital content recorded on multiple volumes (or other multiple elements) of digital media, such as for example movies recorded on more than one DVD, without any substantial requirement for the user to intervene at a switching point between those multiple volumes.

2. A bookmark can be combined with a watchpoint, with consequent action of the watchpoint set to return to bookmark, with the effect that the bookmark-watchpoint section of the media stream can be selected out as an independent film clip to be repeated, either (a) for a selected duration, (b) for a selected number of repeats, (c) until some user action is taken, or (d) some other conditional ending condition.

For a first set of examples, not intended to be limiting in any way: (a) A first media stream intended to simulate an arcade game can include a pointer to a repeating film clip of that arcade game in "attract mode." (b) An arcade game could be made interactive, with end-user actions or commands being incorporated into conditional triggers for watchpoints, with the effect that the end-user could be presented with a substantially continuous media stream, with that substantially continuous media stream being in fact dynamically generated in response to end-user actions or commands. (c) A media stream of any kind, such as for example an arcade game or a computer game, an interactive movie, or other media stream, could include a media stream by which a selected process determines presentation of such selected film clips. The selected process could be responsive to (i) a pseudorandom or random effect, (ii) demographic or other metadata about the end-user, (iii) known preferences of the end-user, whether stated explicitly or inferred from past end-user choices, or (iv) collaborative filtering or similar known techniques. This could have the effect of providing the capability of a film clip "screen saver" or a variant of the MTV channel. (d) A media stream of any kind, such as for example an arcade game or a computer game or, an interactive movie, or other media stream, could include a media stream using individual film clips, either from pre-existing DVD media or newly-created digital content. For example, a computer game might be interactive, or might respond to external information, such as for example television news feeds.

For a second set of examples, not intended to be limiting in any way: (a) A first media stream intended to simulate a movie can include a pointer to a repeating film clip of a trailer or a sequence of key scenes from that movie, again without involving including a copy of that film clip in the first media stream. (b) A media stream associated with a set of movies can contain a pointer for at least some of those movies to a repeating film clip for presentation with a user interface for selecting one or more of those movies for presentation, again without involving including a copy of that film clip in the first media stream.

For a third set of examples, not intended to be limiting in any way: (a) A first media stream intended to represent a demonstration or training film can include a pointer to a repeating film clip of an element to be demonstrated or trained. (b) One specific example of this includes a first media stream intended to represent a demonstration of setting up a home movie theatre as described in embodiments described herein and in the incorporated disclosures. (c) A demonstration or training film could be interactive, with user commands being incorporated into conditional triggers for the watchpoints, with the effect that the end-user could be presented with a set of choices, either to demonstrate or simulate a "real life" circumstance, or to present a video formatted interactive quiz.

3. A watchpoint could be combined with performing operations external to presentation in response to the media stream, such as for example turning up room lights at the start of movie credits, diminishing sound volume during commercial breaks, or pausing presentation in response to an incoming telephone call.

Generally, a bookmark or a watchpoint could be combined with generalized detection of state for any manner of device whose state is available to the presentation controller 130, and could be combined with generalized alteration or editing of state for any manner of device whose state can be changed (or requested to be changed, such as by request to a server device controlling that device) by the presentation controller 130.

For a first set of examples, not intended to be limiting in any way: Devices whose state could trigger a watchpoint might include telephone calls (beginning, ending, lasting beyond a selected time, or having more than a selected volume), internet connections (beginning or ending, such as for example instant messaging, email, or file transfer), internet state (such as for example changes to selected monitored web sites or RSS feeds), home appliance detectors, such as for example doorbells, motion detectors, intrusion alarms, heat sensors, door or window sensors, and power usage detectors), vehicle status detectors for presentation devices 120 installed on vehicles (such as airplanes, automobiles, buses, ships or trucks) including the possibility of controllers for those vehicles, GPS detectors for location or velocity of those vehicles, and the like. In the case of vehicles, devices whose state could trigger a watchpoint might include sensors relating to the vehicle, such as for example incoming audio or video sensors, or incoming radio signals on selected frequencies (such as for example an aircraft control tower or an emergency signaling frequency).

For a second set of examples, not intended to be limiting in any way: Devices whose state could be altered or edited by the presentation controller 130 might include telephone calls (such as for example answering or initiating an automated telephone call in response to a selected change in state, such as for example automatically calling a parent if an X-rated movie is selected for presentation, or if a movie is selected for presentation after 11:30 pm), internet connections (such as for example sending an FTP log of all movies selected for presentation, and how far into the movie the presentation proceeded, possibly after requesting a credit card number from the end-user), presentation device controls (such as for example controlling the volume of the presentation device 120, or even blanking the screen or turning off the presentation device 120 in response to a triggering event), home appliance controls (such as for example turning up the house lights and turning on a radio station at low volume, in response to the end of a movie), vehicle controls (such as for example presenting an airline safety video to passengers in response to an airplane reaching a selected altitude, or switching DVD players from region 1 to region 2 in response to a GPS detector, or switching presentation options from the English language to the French language in response to a selected location within the English Channel.

At a step 243, the method 200 performs the consequent actions, including (as described above) a designated set of actions for the method 200 to take in response to when the watchpoint is triggered. As described above, the consequent actions might include transfer of a locus of presentation to a selected bookmark.

At a flow point 240B, the method 200 has triggered selected behavior at a designated watchpoint, and is ready to either do so again, or to do something else.

TECHNICAL APPENDIX

A Technical Appendix is submitted with this application and hereby made a part of this application. The Technical Appendix, and all references cited therein, are hereby incorporated by reference as if fully set forth herein.

At least the following documents are part of the technical appendix:

"Automatic Masking" (Revision 5, 2003 Aug. 7).
"DVD Bookmarks" (Revision 4, 2003 May 11).

Alternative Embodiments

Although preferred embodiments are disclosed herein, many variations are possible which remain within the concept, scope, and spirit of the invention. These variations would become clear to those skilled in the art after perusal of this application.

The invention is not restricted to movies, but is also applicable to other media streams, such as for example animation or sound, as well as to still media, such as for example pictures or illustrations, and to databases and other collections of information.

Those skilled in the art will recognize, after perusal of this application, that these alternative embodiments are illustrative and in no way limiting.

The invention claimed is:

1. A computer-implemented method of providing bookmarks and watchpoints for selection and presentation of media streams, comprising:
   creating a bookmark associated with a media stream; and
   creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said media stream comprises a plurality of subportions, and said method further comprising:
   determining which of said plurality of subportions are available to a user; and
   presenting those subportions of said media stream which are available to said user.

2. A computer-implemented method of providing bookmarks and watchpoints for selection and presentation of media streams, comprising:
   creating a bookmark associated with a media stream; and
   creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint action includes:
   applying a set of parameters while selecting a particular media stream; and
   presenting at least a portion of that particular media stream under control of those parameters.

3. A method as in claim 2, wherein said condition is associated with a feature of the presentation device on which the media stream is being presented.

4. A method as in claim 2, wherein that media stream includes a movie originally encoded on multiple physical volumes of media.

5. A method as in claim 2, wherein said watchpoint action includes a sequence of more than one instruction.

6. A method as in claim 2, wherein said watchpoint action includes a sequence of more than one instruction collectively capable of being recorded, retrieved, sent, or received.

7. A method as in claim 2, wherein said watchpoint action comprises manipulating any bookmark or watchpoint.

8. A method as in claim 2, wherein said watchpoint action comprises a sequence of sub-actions.

9. A method as in claim 8, wherein that sequence of sub-actions includes steps of maintaining at least some state information between sub-actions.

10. A method as in claim 2, wherein said watchpoint action includes directing an action of a device communicatively coupled to said presentation device.

11. A method as in claim 2, wherein said watchpoint action includes obtaining a response to a request for viewer preferences.

12. A method as in claim 2, wherein said condition comprises:
   determining whether said presentation device has decoded or presented a selected portion of said media stream.

13. A method as in claim 2, wherein said watchpoint trigger includes a location of said presentation device.

14. A method as in claim 2, wherein said watchpoint trigger includes a status of said presentation device.

15. A method as in claim 2, wherein said watchpoint trigger includes a type of said presentation device.

16. A method as in claim 2, wherein those parameters are selected from a group having at least one of the following elements:
   which demographic grouping or maturity level is associated with that particular media stream;
   whether a particular language is associated with that particular media stream;
   whether subtitles are associated with that particular media stream; or
   whether a particular scene is absent from that particular media stream.

17. A computer-implemented method of providing bookmarks and watchpoints for selection and presentation of media streams, comprising:
   creating a bookmark associated with a media stream; and
   creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint action comprises:
   selecting one or more alternative scenes for presenting within a particular media stream; and
   presenting at least a portion of that particular media stream under control of those alternative scenes.

18. A computer-implemented method of providing bookmarks and watchpoints for selection and presentation of media streams, comprising:
   creating a bookmark associated with a media stream; and
   creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint action comprises:
   creating one or more bookmarks or watchpoints other than already available in the media stream.

19. A computer-implemented method of providing bookmarks and watchpoints for selection and presentation of media streams, comprising:
   creating a bookmark associated with a media stream; and
   creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint action comprises:
   maintaining, in response to a status of said presentation device, information regarding one or more of: a user preference; the availability of licenses at said presentation device; said media stream; a particular presentation of said media stream; said presentation device; or one or more viewers.

20. A computer-implemented method of providing bookmarks and watchpoints for selection and presentation of media streams, comprising:
   creating a bookmark associated with a media stream; and creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a date or time zone associated with said presentation device.

21. A computer-implemented method of providing bookmarks and watchpoints for selection and presentation of media streams, comprising:
creating a bookmark associated with a media stream; and
creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a set of demographic information about one or more viewers.

22. A computer-implemented method of providing bookmarks and watchpoints for selection and presentation of media streams, comprising:
creating a bookmark associated with a media stream; and
creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a set of explicit or implicit parental controls.

23. A computer-implemented method of providing bookmarks and watchpoints for selection and presentation of media streams, comprising:
creating a bookmark associated with a media stream; and
creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a set of explicit or implicit user preferences.

24. A computer-implemented method of providing bookmarks and watchpoints for selection and presentation of media streams, comprising:
creating a bookmark associated with a media stream; and
creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a set of metadata available to said presentation device.

25. A computer-implemented method of providing bookmarks and watchpoints for selection and presentation of media streams, comprising:
creating a bookmark associated with a media stream; and
creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a status of availability of a license to said presentation device.

26. A computer-implemented method of providing bookmarks and watchpoints for selection and presentation of media streams, comprising:
creating a bookmark associated with a media stream; and
creating a watchpoint having a watchpoint trigger and a watchpoint action, wherein said watchpoint trigger comprises a condition and is associated with said bookmark, such that when a presentation device presenting said media stream reaches said bookmark, said watchpoint action occurs if said condition is fulfilled, and wherein said watchpoint trigger includes a status of one or more devices other than said presentation device.

27. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said watchpoint trigger comprises a bookmark associated with said media stream.

28. The computer-implemented method of claim 27, wherein said watchpoint trigger comprises a media stream state associated with said media stream.

29. The computer-implemented method of claim 27, wherein said watchpoint trigger comprises a user interaction.

30. The computer-implemented method of claim 27, wherein said watchpoint trigger comprises a presentation environment consideration.

31. The computer-implemented method of claim 27, wherein said watchpoint action comprises accessing a location within said media stream.

32. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said watchpoint trigger comprises availability of a feature of said presentation device.

33. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said watchpoint action comprises accessing a bookmark associated with said media stream.

34. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;

detecting an occurrence of said watchpoint trigger during presentation of said media stream; and performing said watchpoint action, conditioned upon said occurrence of said watchpoint trigger, wherein said watchpoint action comprises accessing a location within another media stream.

35. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said watchpoint action comprises accessing a bookmark associated with another media stream.

36. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said watchpoint action comprises setting a presentation state of said presentation device.

37. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said watchpoint action comprises setting a presentation state for a presentation environment.

38. A computer-implemented method of utilizing a watchpoint associated with a media stream, comprising:
creating said watchpoint, said watchpoint comprising:
a watchpoint trigger associated with said media stream and a logical state of a presentation device; and
a watchpoint action;
detecting an occurrence of said watchpoint trigger during presentation of said media stream; and
performing said watchpoint action, conditioned upon said occurrence of said watchpoint trigger, wherein said detecting comprises detecting said logical state of said presentation device.

39. The computer-implemented method of claim 38, wherein said detecting said logical state comprises reading a plurality of registers of said presentation device.

40. The computer-implemented method of claim 38, wherein said logical state corresponds to a presentation state of said presentation device.

41. The computer-implemented method of claim 38, wherein said logical state corresponds to a virtual machine state of said presentation device.

42. The computer-implemented method of claim 38, wherein said detecting comprises detecting a current state of said media stream.

43. The computer-implemented method of claim 38, wherein said watchpoint comprises a plurality of watchpoint actions, and said performing comprises performing said plurality of watchpoint actions, conditioned upon said occurrence of said watchpoint trigger.

44. The computer-implemented method of claim 38, wherein said watchpoint comprises a plurality of watchpoint triggers, and said detecting comprises detecting an occurrence of each of said plurality of watchpoint triggers.

* * * * *